United States Patent
Calabrese et al.

(10) Patent No.: US 6,236,857 B1
(45) Date of Patent: May 22, 2001

(54) METHODS AND APPARATUS FOR ACCESSING ENHANCED WIRELESS SERVICES PLATFORMS VIA THE PUBLIC SWITCHED TELEPHONE NETWORK

(75) Inventors: Robert T. Calabrese, Naperville; Nicholas John Gnesda, Aurora; Douglas Harvey Riley, Naperville; Jeffrey Arthur Zahnle, Elburn, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/107,557

(22) Filed: Jun. 29, 1998

(51) Int. Cl.$^7$ .................................................. H04Q 7/00
(52) U.S. Cl. ..................... 455/426; 455/445; 455/422; 455/520
(58) Field of Search ..................... 455/445, 414, 455/417, 422, 432, 406, 408, 426, 410, 418, 419, 409, 564, 405, 407, 435, 436; 379/111–112, 114–115, 121, 130, 131, 132, 143–144, 355, 366

(56) References Cited

U.S. PATENT DOCUMENTS

| | | | |
|---|---|---|---|
| 5,396,543 | * 3/1995 | Beeson et al. | 379/59 |
| 5,469,496 | * 11/1995 | Emery et al. | 379/58 |
| 5,557,652 | * 9/1996 | Jonsson | 379/57 |
| 5,588,042 | * 12/1996 | Comer | 379/59 |
| 5,678,179 | * 10/1997 | Turcotte et al. | 455/331 |
| 5,742,598 | * 4/1998 | Dunn et al. | 370/393 |
| 5,778,313 | * 7/1998 | Fougnies | 455/406 |
| 5,845,211 | * 12/1998 | Roach, Jr. | 455/436 |
| 5,862,480 | * 1/1999 | Wild et al. | 455/432 |
| 5,884,157 | * 3/1999 | Karni | 455/406 |
| 5,898,917 | * 4/1999 | Batni et al. | 455/564 |
| 5,946,618 | * 7/1998 | Agre et al. | 455/428 |
| 5,946,623 | * 8/1999 | Spradlin | 455/445 |
| 6,038,439 | * 3/2000 | Rune | 455/406 |
| 6,058,300 | * 5/2000 | Hanson | 455/406 |

FOREIGN PATENT DOCUMENTS

9514360 * 5/1995 (WO) ............................. H04Q/7/38

* cited by examiner

Primary Examiner—Daniel Hunter
Assistant Examiner—Pablo Tran (57) ABSTRACT

Techniques for providing enhanced wireless services such as interactive voice services to a serving mobile switching center which is originating a call for a mobile station that requires such services via the public switched telephone network (PSTN). The serving mobile switching center has a trigger which causes it to respond to a call from the mobile station by sending a message according to the IS 41 protocols to the enhanced mobile switching center that provides the enhanced service. The enhanced mobile switching center responds to the message by associating the contents of the message with a temporary local dialing number (TLDN) and sending a message to the serving mobile switching center that contains the TLDN. The serving mobile switching center uses the TLDN to set up a call via the PSTN to the enhanced mobile switching center, which then uses the content of the message associated with the TLDN to establish which enhanced service is required. It calls the service node for the enhanced service and bridges the call from the serving mobile switching center to the service node. The call provides a voice channel for the enhanced service.

27 Claims, 4 Drawing Sheets

FIG. 1
PRIOR ARCHITECTURE

FIG. 2
EMSC SUBSTITUTION OF DEDICATED TRUNKING FOR PSTN

FIG. 4
EMSC SERVING MULTIPLE MSCs

METHODS AND APPARATUS FOR ACCESSING ENHANCED WIRELESS SERVICES PLATFORMS VIA THE PUBLIC SWITCHED TELEPHONE NETWORK

FIELD OF THE INVENTION

The invention relates generally to wireless telephony and more particularly to the provision of enhanced wireless services.

BACKGROUND OF THE INVENTION

An important feature of modern wireless telephony is enhanced wireless services. These are services for which the Mobile Switching Center (MSC) that does the switching for a call originating at a mobile station (MS) such as a cellular telephone requires the assistance of specialized Service Nodes (SN) that have the processing capability to perform the services. One class of such enhanced wireless services is interactive voice services. These services use information obtained from spoken input provided by the person originating the call to route or otherwise process the call. The services are termed "interactive" because they involve voice prompts from the telephone system and voice inputs from the user of the mobile station in response to the prompts. Examples of interactive voice services include services in which voice input is used to select from a menu of choices, for example, between collect and credit card calls;

voice-activated dialing services, in which the user speaks the number he or she wishes to reach; and services which use characteristics of the user's voice to authenticate the user to the wireless telephone system.

All of the interactive voice services require specialized hardware and/or software voice input interpretation systems to handle the voice input. Moreover, the voice input is required to set up the call, and a voice channel must therefore exist for the interactive voice service before the call is set up.

Figure 1:
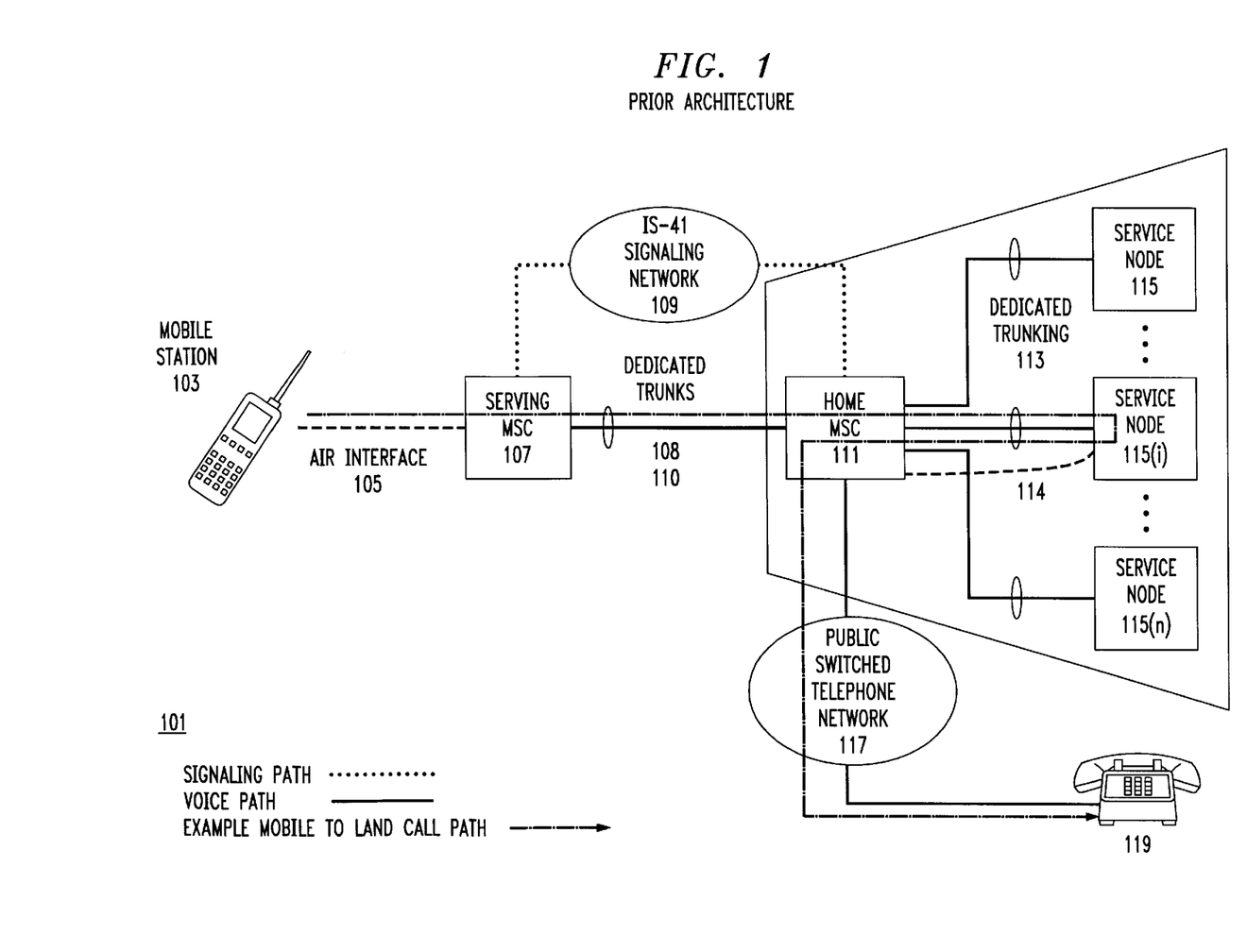
FIG. 1 is a diagram of a prior-art arrangement for providing enhanced wireless services.

FIG. 1 shows how enhanced wireless services such as interactive voice services are presently provided. Arrangement 101 shows a portion of a network for wireless telephony. Two kinds of information are involved in making a call in such a network: signaling information which coordinates the operation of the components of the network during the call, and the audio signals that the call carries once it is set up. In the following, the arrangements in the network for transporting signaling information will be termed signaling channels and the arrangements for transporting audio signals will be termed voice channels. In the figures of this Specification, signaling channels are represented by dashed lines and voice channels by solid lines. Arrangement 101 has an originating mobile station (OMS) 103 which has originated a call that requires an interactive voice service. The interactive voice service is specified by a sequence of digits dialed by the mobile station 103. The call origination goes via a signaling channel 104 provided by air interface 105 to serving MSC 107, the Mobile Switching Center which is currently handling the call origination for mobile station 103. Serving MSC 107 is permanently connected by trunk 109 to enhanced MSC (E-MSC) 111, a Mobile Switching Center which establishes connections to a number of Service Nodes 115 (1 ... n) that contain the special-purpose hardware and software required for the enhanced wireless services. Trunk 109 provides a voice channel 108 between serving MSC 107 and enhanced MSC (E-MSC) 111. Serving MSC 107 is also connected by IS-41 signaling network 109 to enhanced MSC 111. Signaling network 109 provides signaling channel 112 between serving MSC 107 and E-MSC 111. Thus, when serving MSC 107 receives a call origination from a mobile station for a call that requires an interactive voice service, serving MSC 107 uses signaling channel 114 to send the dialed digits specifying the enhanced wireless service to enhanced MSC 111 and uses trunk 109 for voice channel 108. Enhanced MSC 111 then selects Service Node 115(i) required for the service and connects the trunk via local network 113 to the Service Node 115(i), so that voice channel 108 extends to Service Node 115(i). After Service Node 115(i) has performed the service, enhanced MSC 111 uses the result of the voice processing (for example, the digits specified by the voice input) to set up a call via public switched telephone network (PSTN) 107 or some other network to destination station 119. The call extends the voice channel 108 provided by trunk 110 via PSTN 117 to DS 119.

Arrangement 101 serves perfectly well to provide enhanced wireless services. It does, however, have two serious drawbacks:

the arrangement requires trunk 109 between serving MSC 107 and enhanced MSC 111. This both increases the cost of providing enhanced wireless services and prevents service providers who do not have such trunks available to them from providing enhanced wireless services.

whether mobile station 103 is able to take advantage of the enhanced service depends on whether its serving MSC is connected by a trunk to enhanced MSC 111. Because that is so, roaming is not seamless when enhanced wireless services are involved.

It is an object of the techniques disclosed herein to overcome the above and other problems of current techniques for providing enhanced wireless services.

SUMMARY OF THE INVENTION

In a wireless communication system enhanced service features, such as prepaid services, which a wireless subscriber has paid for, might not be available to the subscriber when roaming in a foreign coverage area. Custom service features, which require equipment in the service provider's coverage area, can still be accessed from outside the coverage area of the custom-feature service provider's coverage area by linking a wireless subscriber through the Public Switched Telephone Network to equipment in the service provider's network.

The serving Mobile Switching Center of another service provider is directed to transport the call over the PSTN to an Enhanced Mobile Switching Center (E-MSC) in the subscribers home market. The E-MSC then both 1). reconstructs the call by combining information received from the IS-41 signaling network and the Public Switched Telephone Network 2). routes the call to the proper enhanced service.

The reference numbers in the drawings have at least three digits. The two rightmost digits are reference numbers

DETAILED DESCRIPTION OF THE PREFERRED EMBODIMENT

Figure 2:
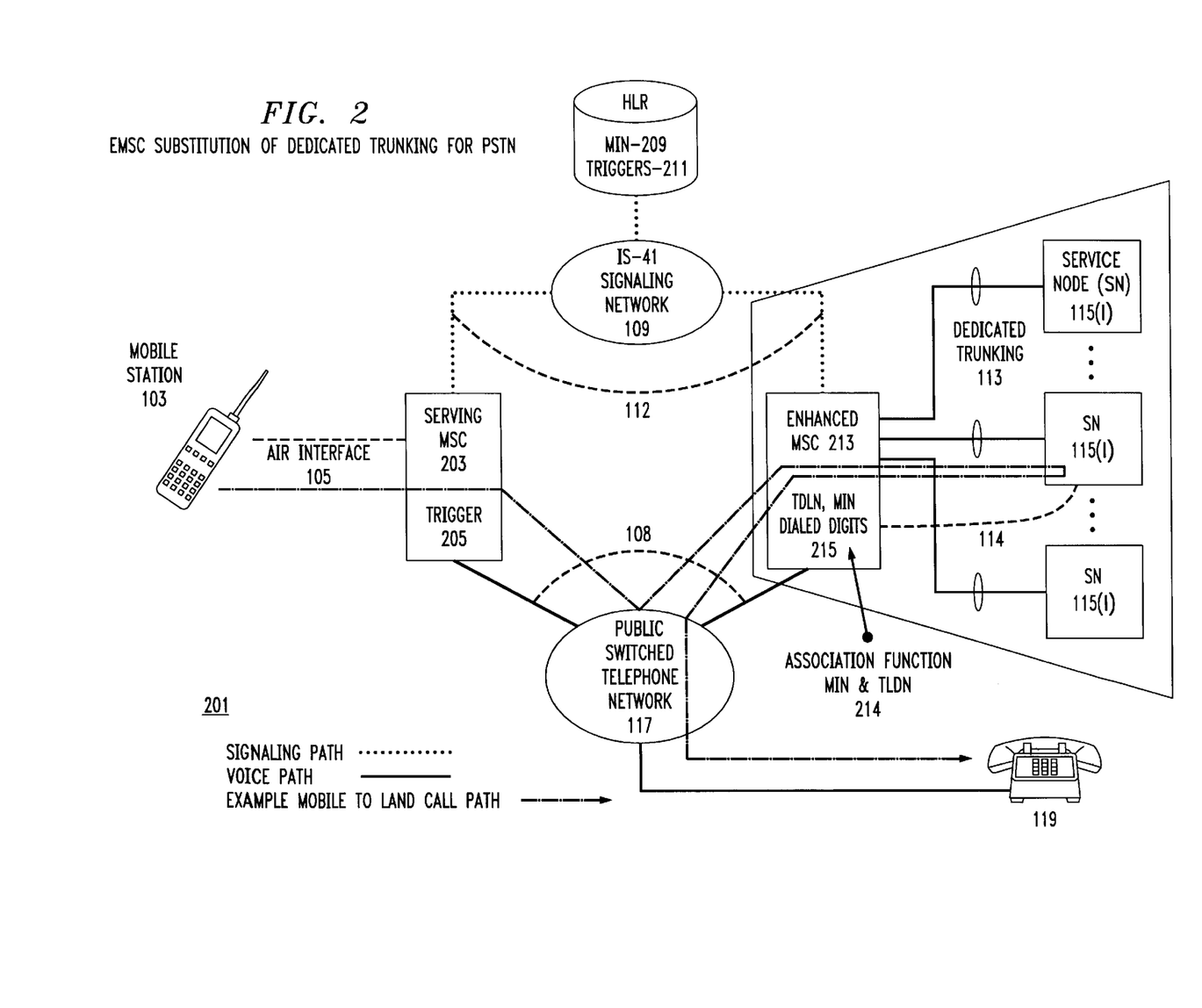
FIG. 2 is a diagram of an arrangement for providing enhanced wireless services in which the invention is practiced.

As pointed out above, the fact that arrangement 101 requires that serving MSC 107 be connected to enhanced MSC 111 by trunk 109 means that mobile station 103 can use enhanced wireless services only if calls it originates are being handled by a serving MSC 107 that is connected to such a trunk. This problem is solved in arrangement 201, shown in FIG. 2. The chief difference between FIG. 1 and FIG. 2 is that there is no longer a trunk connecting serving MSC 203 to enhanced MSC 213. Instead, the connection for voice channel 108 is provided by PSTN 117. As before, IS-41 signaling network 109 provides signaling channel 112 between serving MSC 103 and enhanced MSC 213.

In arrangement 201, enhanced wireless services are provided as follows: when serving MSC 203 receives a call origination from a mobile station 103 which employs an enhanced wireless service, it first using signaling channel 112 as before to indicate the enhanced service needed to E-MSC 213 and then makes a call via PSTN 207 to E-MSC 213 to provide the voice channel 108 required for the enhanced wireless service. E-MSC 213 in turn responds to the call directed to it by serving MSC 203 by originating a call via local network 113 to Service Node 115(i) for the enhanced wireless service as before. The voice input for the enhanced wireless service goes via these calls to Service Node 115(i), which processes the voice input as required for the enhanced wireless service and provides the results of the processing to E-MSC 213. E-MSC 213 then uses the result in directing the call via PSTN 117 to destination station 119. For example, if the results are digits input by voice, E-MSC 213 uses the digits to set up a call via PSTN 117 to the telephone number specified by the digits.

Since public switched telephone network 117 is essentially world-wide, any serving MSC 203 may be connected to any enhanced MSC 213, and there is no longer any restriction of enhanced wireless services to particular serving MSCs. Moreover, because that is so, a mobile station 103 that uses advanced wireless services can now roam seamlessly, without regard to which MSC is presently serving it.

Implementation of the Solution

In order to implement the solution just described, two problems must be solved:

serving MSC 203 must be made aware that mobile station 103 uses an enhanced service assistance; and When serving MSC 203 calls E-MSC 213, E-MSC 213 must have some way of relating the call to a specific enhanced service.

In other words, mobile station 103 must be associated with a label indicating its use of a particular enhanced wireless service in serving MSC 203 and when serving MSC 203 sets up a call via the PSTN to E-MSC 213, there must be a label in E-MSC 213 which associates the call with the particular enhanced wireless service.

In the context provided by the IS-41 and PSTN signaling standards, these problems are solved in the following fashion:

the IS-41 originating trigger mechanism is used to associate a mobile station with an enhanced wireless service; and serving MSC 203 uses the IS-41 signaling protocols to provide information about the enhanced wireless service to the E-MSC, which associates the information with a temporary local dialing number (TLDN). The enhanced MSC then uses the IS-41 protocols to provide the TLDN to the serving MSC, which uses the TLDN to call the E-MSC via the PSTN. When the E-MSC receives the call, it uses the information associated with the TLDN to call the Service Node and provide the advanced wireless service.

Both of these solutions will be explained in detail in the following.

A trigger in the IS-41 standard is an indication that an MSC is to perform a particular action when it processes a call for a particular mobile station. There are various classes of triggers: two of which are origination triggers and termination triggers. An origination trigger indicates an action to be performed by the MSC at which a call originates; a termination trigger indicates an action to be performed by the MSC at which a call terminates. Each mobile station 103 has a Home Location Register 209 which is accessible via IS-41 signaling network 109 and which contains information describing the mobile station. Included in this information are the mobile identification number (MIN), which is an identification number for the mobile station, the mobile directory number (MDN), which identifies a directory entry for the mobile station in its home cellular system, and trigger information 211, which includes indicators for the origination and/or termination triggers that apply for a mobile station.

When a mobile station enters the area served by the MSC and first comes to the attention of the MSC, the MSC (now the serving MSC 203) polls the mobile station and obtains at least the MIN for the mobile station. MSC 203 uses signaling channel 112 to send the mobile stations's MIN to Home Location Register 209 and thereby to notify Home Location Register 209 that the mobile station has registered itself with MSC 203. In response, Home Location Register 209 returns information about the mobile station. Included in the information are parameters which indicate what triggers apply to the mobile station and the MDN for the mobile station. In the case of mobile station 103, the trigger parameters include an origination parameter that indicates that when mobile station 103 originates a call, serving MSC 203 is to use signaling channel 112 to set up the use of PSTN 117 as a voice channel for the enhanced service.

MSCs and E-MSCs typically have pools of temporary local dialing numbers which they use to represent calls that terminate at the MSC (i.e., are directed to mobile stations registered with the MSC). When the call is to a mobile station that is served by the MSC, a temporary local dialing number from the pool is associated with the mobile station to which the call is directed for the duration of the call. Since the temporary local dialing number is a standard telephone number, a call may be made to the temporary local dialing number via the PSTN and the temporary local dialing number may be used to set up a voice channel to the MSC or E-MSC. As the TLDNs are normally used, however, there is no way of using them to set up a voice channel to an enhanced service. The reason for this is that the PSTN signaling system provides no way of relating the telephone call to the TLDN to an enhanced service. Thus, if the call is being used to obtain a voice channel for use by an enhanced wireless service, some way must be found of relating it to the enhanced service.

The technique that is used in the preferred embodiment is to use the IS-41 signaling channel 112 to transfer the information needed to relate the PSTN call to the enhanced service. This is done prior to setting up the PSTN call. In the first stage of the information transfer, serving MSC 203 responds to the trigger for mobile station 103 by sending E-MSC 213 the MIN and MDN for mobile station 103 together with the digits dialed by mobile station 103. E-MSC 213 then forms association 114 between a TLDN 215 and the information provided by serving MSC 203 and returns TLDN 215 to serving MSC 203 via signaling channel 112. Serving MSC 203 uses TLDN 215 to set up the PSTN call. When E-MSC 213 receives the call directed to TLDN 215, it uses association 214 to determine which enhanced service is required. It then calls a Service Node 115(i) that provides the service and bridges the PSTN call from serving MSC 203 to the call to Service Node 115(i), thereby extending voice channel 108 to Service Node 115(i). The Service Node then performs the service, returning a result to E-MSC 213, which releases the call to Service Node 115(i) and uses the result of the service in completing the call via PSTN 117 to DS 119. In other embodiments, the result may be returned via signaling channel 112 to serving MSC 203 or some other MSC or E-MSC and used there to further process the call In the context of the IS-41 and FIG. 2, the above can be described in more detail as follows:

When mobile station 103 registers with serving MSC 203, serving MSC 203 sends a REGNOT IS-41 signaling message to HLR 209, which responds with a regnot message that contains the MIN, MDN, and trigger information 211 for mobile station 103. MSC 203 responds to the regnot message by arming a call origination trigger 205 for mobile station 103. Trigger 205 indicates that on originating a call from mobile station 103, serving MSC 203 should send an ORREQ IS-41 signaling message to E-MSC 213.

Thus, when mobile station 103 originates a call, MSC 203 responds to the call origination by sending an ORREQ message to E-MSC 213 via signaling channel 112. The ORREQ message contains the dialed digits received from the mobile station, and the mobile station's MIN and MDN. As indicated above, the dialed digits indicate the kind of enhanced service required. E-MSC 213 responds by setting up association 214, which associates a free TLDN 215 with the dialed digits, the MIN, and the MDN and sending an orreq message via signaling channel 112 to serving MSC 203 which contains TLDN 215. Serving MSC 203 then sets up a call to TLDN 215 via PSTN 117. The PSTN signaling channel provides TLDN 215 to E-MSC 213, which uses it to locate association 214. E-MSC 213 then uses the dialed digits in the association to determine which Service Node 115 is required, sets up a call to that Service Node 115 via local network 113, and bridges the PSTN call from MS 103 to the call to the Service Node, thus extending voice channel 108 to SN 115(i). E-MSC 213 also provides the dialed digits, the MDN, and the MIN as required for the enhanced service to SN 115(i). The interaction between the user of mobile station 103 and SN 115(i) takes place over the voice channel 108. In the interaction, SN 115(i) typically provides a voice prompt, receives an input in response to the prompt, and processes the input in order to determine what to do next. In some cases, that will involve other prompts to elicit further responses from the user; finally, however, the processing will yield a result that Service Node 115(i) passes to E-MSC 213 via signaling channel 114. The result will, of course, depend on the kind of interactive voice service. For example, with voice-based user authentication, it may be simply an indication that the user has authenticated himself or failed to do so; with voice-activated dialing systems, it will be at least the digits spoken by the user.

Having obtained the result, E-MSC 213 releases the call it originated to Service Node 115(i) and processes the PSTN call from serving MSC 203 as required by the result. For example, if the enhanced service was a voice-based authentication service and if the result authenticates the user of mobile station 103, serving MSC 203 will redirect the call via PSTN 117 to the destination indicated by the telephone number dialed by the user.

To take a specific example, voice-activated dialing works in system 201 as follows: When mobile station 103 registers with serving MSC 203, serving MSC 203 determines from the information it receives about mobile station 103 from HLR 209 that it is to arm a call origination trigger 205 for voice-activated dialing. Serving MSC 203 arms trigger 205. When the user of mobile station 103 makes a call, the user pushes a button on the telephone that causes the telephone to send the code for voice-activated dialing as the dialed digits. Serving MSC 203 responds to the trigger by using signaling channel 112 to send the dialed digits indicating voice-activated dialing to E-MSC 213, which saves them in association 214. E-MSC 213 responds by temporarily associating TLDN 215 with association 214 and returning TLDN 215 to serving MSC 203. Serving MSC 203 then redirects the call it is originating for mobile station 103 via PSTN 207 to TLDN 215. When the call arrives in E-MSC 213, the call establishes a voice channel 108 in PSTN 207 between mobile station 103 and E-MSC 213. E-MSC 213 then uses the information in association 214 for TLDN 215 to originate a call to SN 115(i) for voice-activated dialing. Once this call is set up, E-MSC 213 bridges the two calls, thus establishing a voice channel between SN 115(i) and mobile station 103. SN 115(i) uses the voice channel to prompt for the telephone number desired by the user and to receive the user input. SN 115(i) then uses its voice processing hardware and software to analyze the input to obtain the digits corresponding to the input and provides the digits to E-MSC 213, which takes down the call to SN 115(i) and uses the digits to redirect the call via PSTN 117 to the destination specified by the digits.

Figure 3:
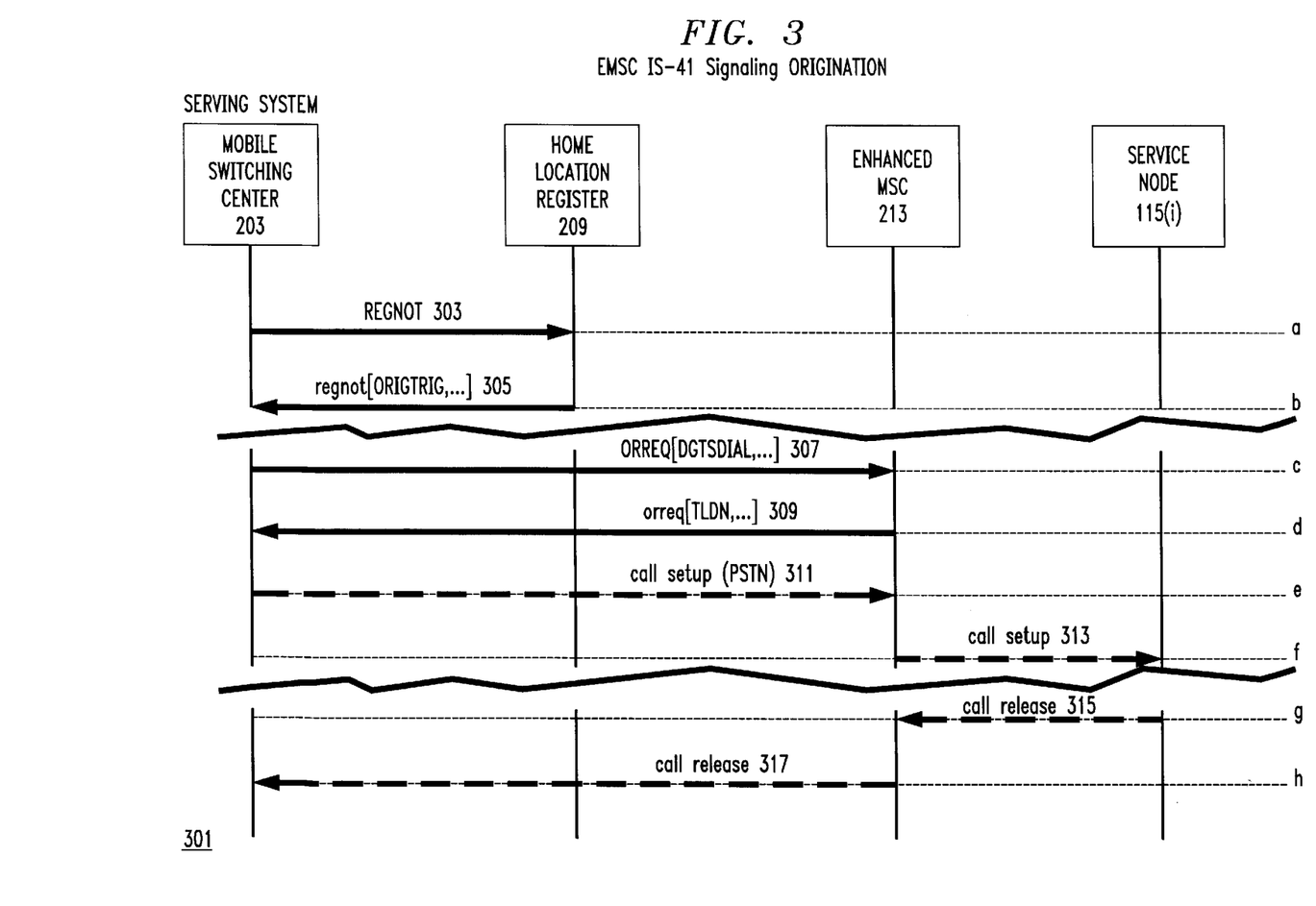
FIG. 3 is a detailed scenario diagram of an implementation of the technique of the invention.

Scenario Diagram for the Technique: FIG. 3

In the telephony arts, interactions between components of a telephone system are represented by means of scenario diagrams. FIG. 3 is a scenario diagram for the technique shown in FIG. 2. In the scenario diagram, the components that are interacting are represented by boxes at the top of the diagram. Each box has a vertical line drawn from it to the bottom of the diagram. Arrows between the vertical lines represent messages sent between the components to which the vertical lines belong. The direction of the arrow indicates the source and destination for the message. Labels on the arrows indicate the contents of the message and the styles in which the arrows are printed indicate types of messages.

In FIG. 3, the boxes are the components of FIG. 2. There are further two types of messages exchanged by the components, messages belonging to the IS 41 networking standard, represented in heavy black, and messages belonging to the PSTN networking standard, represented in gray. The figure thus shows how when mobile station 103 becomes known to serving MSC 203, serving MSC sends a registration notification (REGNOT) message 303 to HLR 209; HLR 209 responds with a return message (regnot) that contains origination triggers 205 (ORIGTRIG) for enhanced services required by mobile station 103. MSC 203 responds to message 305 by arming the triggers. There is then a break in the diagram, since nothing further happens until mobile station 103 originates a call.

When that happens, serving MSC 203 responds as specified by the trigger and sends an origination request (ORREQ) message 307 to E-MSC 213 with the digits dialed (DGTSDIAL) information received from MS 103 and MS 103's MIN and MDN. This information indicates the enhanced service required by MS 103.

E-MSC 213 responds with an origination reply (orreq) message 309 which includes the TLDN(i) 215 that E-MSC 213 has temporarily assigned to the enhanced service specified by DGTSDIAL in message 307. As shown by arrow 311, MSC 203 then sets up a call to E-MSC 213 via PSTN 117. E-MSC 213 then sets up a call via local network 113 to Service Node 115(i), as shown by arrow 313. This call and the one set up as indicated by arrow 311 provide the necessary voice channel between mobile station 103 and Service Node 115(i), and Service Node 115(i) then interacts with the user of mobile station 103 as required for the enhanced service. The period of interaction is indicated by the break in the diagram. When the interaction is over, SN 115(i) returns the result of the interaction via the signaling channel belonging to the call between E-MSC 213 and SN 115(i) to E-MSC 213, which in turn releases the call set up by arrow 311 (arrow 315) and uses the result in directing the call set up by arrow 311 via PSTN 117 to destination station 119. When the call is finished, it is released, as indicated by arrow 317.

Figure 4:
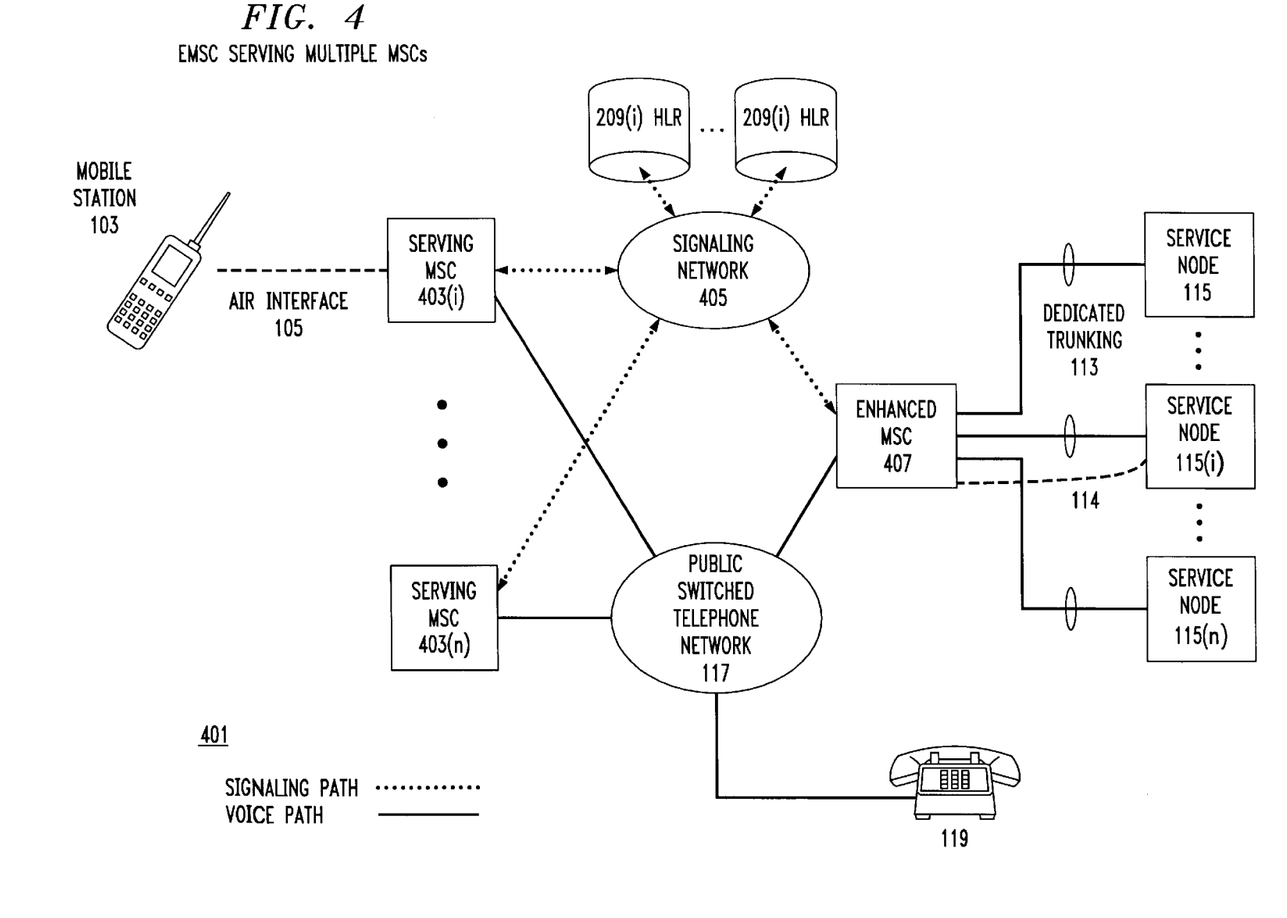
FIG. 4 is a diagram of a mobile telephony network that makes general use of the techniques developed for enhanced wireless services.

Generalizations: FIG. 4

In general terms, the technique used to provide enhanced services in arrangement 201 is the following:

when serving MSC 203 requires a service of E-MSC 213 for which a voice channel is necessary, serving MSC 203 uses signaling channel 112 to send a message to E-MSC 213 indicating that a voice channel is needed and why.

E-MSC 213 associates the message content with a TLDN and returns the TLDN via signaling channel 112 to serving MSC 203;

Serving MSC 203 uses the TLDN to call E-MSC 213 via PSTN 117, providing a voice channel 108 which E-MSC 213 uses to provide the service specified by the message content and also to complete the call to its destination.

This technique can be used not only to permit an E-MSC to provide enhanced wireless services to a serving MSC 203, but to permit an E-MSC to provide any service that requires such a channel, including a simple call to destination station 119 (in which case, the message would have the identification for the originating mobile station and the telephone number for destination station 119). The technique thus permits construction of a mobile switching system that has two characteristics:

the intelligence of the system can be concentrated in a few MSCs; and

The PSTN can provide the voice channel for the system.

FIG. 4 shows such a system 201. The system includes a number of simple Mobile Switching Centers 403(i . . . n) and an Enhanced Mobile Switching Center (E-MSC) 407. The simple Mobile Switching Centers 403(i . . . n) can communicate with E-MSC 407 by means of signaling network 405, which provides signaling channels, and PSTN 117, which provides voice channels. A simple Mobile Switching Center 403 needs only to be able to do three things: deal with air interface 105, send E-MSC 407 signaling messages via signaling network 405 indicating what services it needs (e.g., origination trigger), receive a signaling message from E-MSC 407 that contains a telephone number, and set up a call via PSTN 117 using the telephone number provided by E-MSC 407. All other processing required for the call is done by E-MSC 407, including routing the call via PSTN 117 to its final destination DS 119.

Since roaming costs can contribute significantly to a service providers revenue the ability to provide enhanced service, such as prepay, outside of the home market through the use of the standard PSTN provides an advantage.

Moreover, existing networks can provide all of the signaling and voice channels needed between the SMSCs 403 and the E-MSCs 407, with the voice channels being provided by existing PSTN networks and the signaling channels being provided by any digital network that provides digital messaging that satisfies the real-time constraints of signaling network 405's signaling protocols. The techniques of system 401 thus make it possible to set up new mobile telephone networks quickly and cheaply, without the capital expense and delay associated with building dedicated (101) networks for carrying the voice and signaling channels.

Conclusion

The foregoing Detailed Description has disclosed to those skilled in the radio telephony arts how to build a system that uses the PSTN as the voice channel between the MSC and the E-MSC when the E-MSC provides interactive voice services to the MSC. In a preferred embodiment, the signaling channel is implemented using the IS-41 signaling protocols, but any other protocols which make it possible to exchange the necessary messages between the MSC and E-MSC can be used as well. Similarly, any publicly-available telephone network can be used in place of the PSTN, including a packet telephony network. Moreover, as explained above, the technique can be used whenever a MSC requires the assistance of an E-MSC, and consequent makes it possible to construct a mobile switching network consisting of a small number of complex MSCs and a large number of simple MSCs, with voice channels between the SMSCs and the E-MSCs being provided by the PSTN and signaling channels being provided by a public digital network. Of course, if a digital network is available which can provide the voice channels as well, it can be used for both sets of channels.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of processing a call which a first switching center makes for a station that has access to the first switching center, the method comprising the steps of:

in the first switching center, sending a first message containing a description of the call to a second switching center via a signaling channel that is independent of the public switched telephone network (PSTN);

in the second switching center, responding to the first message by associating the description with a first telephone number in the PSTN for the second switching center and sending a second message containing the telephone number to the first switching center via the signaling channel;

in the first switching center, using the first telephone number to make the call; and in the second switching center, responding to the call by processing the call according to the description of the call associated with the first telephone number.

2. The method set forth in claim 1 wherein:

the call description includes a second telephone number in the PSTN for a destination of the call; and in the step of processing the call, the second switching center uses the second telephone number to route the call to the destination via the PSTN.

3. The method set forth in claim 1 wherein:

the second switching center has access to an enhanced call processing service;

the call description specifies the enhanced call processing service; and in the step of processing the call, the second switching center uses the enhanced call processing service to process the call.

4. The method set forth in claim 3 wherein:

the enhanced call processing service performs audio signal processing; and the call provides a voice channel for the enhanced call processing service.

5. The method set forth in claim 3 wherein:

the step of processing the call further comprises the step of receiving a result from the enhanced call processing service and sending a third message with the result via the signaling channel to the first switching center for use in processing the call.

6. The method set forth in claim 5 wherein:

there is an indication associated with the station in the first switching center, the indication indicating that the call is to be processed by the second switching center; and the step of sending the first message is performed in response to the indication.

7. The method set forth in claim 6 further comprising the steps performed in the first switching center of:

sending a fourth message via the signaling channel to obtain a description of the station;

responding to a fifth message containing the station description by using the station description to create the indication.

8. The method set forth in claim 7 wherein:

the messages conform to the IS-41 standard, the first message being an ORREQ message containing DIALEDDIGITS specifying the call processing, the second message being an ORREQ message containing a TLDN belonging to the second switching center as the first telephone number, the fourth message being a REGNOT message, and the fifth message being a REGNOT message containing a trigger parameter as part of the station description; and the step of using the station description to create the indication arms a trigger as specified in the trigger parameter.

9. The method set forth in claim 1 wherein:

the enhanced call processing service is accessible to the second switching center via a telephone network; and the step of using the enhanced call processing service comprises the steps of making another call to the enhanced call processing service;

bridging the other call to the call while the enhanced call processing service is processing the call.

10. The method set forth in claim 9 wherein:

the messages conform to the IS-41 standard, the first message being an ORREQ message containing DIALEDDIGITS specifying the call processing and the second message being an ORREQ message containing a TLDN belonging to the second switching center as the first telephone number.

11. The method set forth in claim 9 wherein:

the station is a mobile station.

12. A method employed in a first switching center of processing a call which the first switching center makes for a station that has access to the first switching center, the method comprising the steps of:

sending a first message containing a description of the call to a second switching center via a signaling channel that is independent of the public switched telephone network (PSTN), the second switching center responding to the first message by associating the description with a first telephone number in the PSTN for the second switching center and sending a second message containing the telephone number to the first switching center via the signaling channel; and responding to the second message by using the first telephone number to make the call, the second switching center responding to the call by processing the call according to the description of the call associated with the first telephone number.

13. The method set forth in claim 12 wherein:

the call description includes a second telephone number in the PSTN for a destination of the call; and in processing the call, the second switching center uses the second telephone number to route the call to the destination via the PSTN.

14. The method set forth in claim 12 wherein:

the second switching center has access to an enhanced call processing service;

the call description specifies the enhanced call processing service; and in processing the call, the second switching center uses the enhanced call processing service to process the call.

15. The method set forth in claim 14 wherein:

the enhanced call processing service performs audio signal processing; and the call provides a voice channel for the enhanced call processing service.

16. The method set forth in claim 14 wherein in processing the call, the second switching center further receives a result from the enhanced call processing service and sends a third message with the result via the signaling channel to the first switching center; and the method further comprises the step of using the third message to process the call.

17. The method set forth in claim 16 wherein:

there is an indication associated with the station in the first switching center, the indication indicating that the call is to be processed by the second switching center; and the step of sending the first message is performed in response to the indication.

18. The method set forth in claim 17 further comprising the steps of:

sending a fourth message via the signaling channel to obtain a description of the station; and responding to a fifth message containing the station description by using the station description to create the indication.

19. The method set forth in claim 18 wherein:

the messages conform to the IS-41 standard, the first message being an ORREQ message containing DIALEDDIGITS specifying the call processing, the second message being an ORREQ message containing a TLDN belonging to the second switching center as the first telephone number, the fourth message being a REGNOT message, and the fifth message being a REGNOT message containing a trigger parameter as part of the station description; and the step of using the station description to create the indication arms a trigger as specified in the trigger parameter.

20. The method set forth in claim 12 wherein:

the messages conform to the IS-41 standard, the first message being an ORREQ message containing DIALEDDIGITS specifying the call processing and the second message being an ORREQ message containing a TLDN belonging to the second switching center as the first telephone number.

21. The method set forth in claims 12 wherein:

the station is a mobile station.

22. A method of processing a call made by a first switching center for a station that has access to the first switching center, the method being employed in a second switching center and comprising the steps of:

responding to a first message, the first message being sent by the first switching center to the second switching center via a signaling channel that is independent of the public switched telephone network (PSTN) and containing a description of the call, by associating the description with a first telephone number in the PSTN for the second switching center and sending a second message containing the telephone number to the first switching center via the signaling channel, the first switching center using the first telephone number to make the call; and responding to the call by processing the call according to the description of the call associated with the first telephone number.

23. The method set forth in claim 22 wherein:

the call description includes a second telephone number in the PSTN for a destination of the call; and the step of responding to the call includes the step of using the second telephone number to route the call to the destination via the PSTN.

24. The method set forth in claim 22 wherein:

the second switching center has access to an enhanced call processing service;

the call description specifies the enhanced call processing service; and the step of responding to the call includes the step of using the enhanced call processing service to process the call.

25. The method set forth in claim 24 wherein:

the enhanced call processing service performs audio signal processing; and the call provides a voice channel for the enhanced call processing service.

26. The method set forth in claim 22 wherein the method further comprises the step of:

receiving a result from the enhanced call processing service and sending a third message with the result via the signaling channel to the first switching center for use in processing the call.

27. The method set forth in claim 22 wherein:

the enhanced call processing service is accessible to the second switching center via a telephone network; and the step of using the enhanced call processing service comprises the steps of making another call to the enhanced call processing service; and bridging the other call to the call while the enhanced call processing service is processing the call.

* * * * *